(12) United States Patent
Kiedaisch et al.

(10) Patent No.: US 6,551,010 B1
(45) Date of Patent: *Apr. 22, 2003

(54) ENERGY ABSORBING IMPACT SYSTEM

(75) Inventors: Edward Kiedaisch, Keokuk, IA (US); Michael A. Langford, Keokuk, IA (US); Michael J. Grimsley, Keokuk, IA (US); Lars G. Jonsson, Trelleborg (SE); Mats A. Malmberg, Trelleborg (SE); Bengt L. Dehlen, Trelleborg (SE)

(73) Assignee: Metso Minerals Industries, Inc., Milwaukee, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/704,229

(22) Filed: Nov. 1, 2000

Related U.S. Application Data

(63) Continuation-in-part of application No. 09/407,508, filed on Sep. 28, 1999, now Pat. No. 6,309,140.

(51) Int. Cl.[7] ................................................ E01F 15/00
(52) U.S. Cl. ............................ 404/6; 404/10; 256/13.1
(58) Field of Search ............................ 404/6, 7, 9, 10, 404/12; 256/1, 13.1

(56) References Cited

U.S. PATENT DOCUMENTS

| 1,158,295 A | | 10/1915 | Rodriguez |
|---|---|---|---|
| 1,530,394 A | | 3/1925 | Muller |
| 1,605,888 A | | 1/1926 | Beaubien et al. |
| 1,956,757 A | * | 5/1934 | Eckel ............................ 256/1 |
| 2,974,934 A | * | 3/1961 | White ........................ 256/13.1 |
| 3,507,123 A | | 4/1970 | Miura |
| 3,600,869 A | | 8/1971 | Petroff |
| 3,788,082 A | | 1/1974 | Narabu |
| 3,948,500 A | | 4/1976 | Korbuly et al. |
| 4,073,482 A | | 2/1978 | Seegmiller et al. |
| 4,186,913 A | | 2/1980 | Bruner et al. |
| 4,285,616 A | | 8/1981 | Evetts |
| 4,289,419 A | | 9/1981 | Young et al. |
| 4,319,539 A | | 3/1982 | Fujii et al. |
| 4,399,980 A | | 8/1983 | Van Schie |
| 4,452,431 A | | 6/1984 | Stephens et al. |
| 4,497,593 A | | 2/1985 | Kramer |
| 4,548,151 A | | 10/1985 | Files et al. |
| 4,554,882 A | | 11/1985 | Lemmens |
| 4,583,716 A | | 4/1986 | Stephens et al. |

(List continued on next page.)

FOREIGN PATENT DOCUMENTS

JP 210514 8/1989

OTHER PUBLICATIONS

Svedala Brochure, Trellex Fender Systems (30 pages).
Svedala Brochure, Trellex Application Manual (30 pages).

*Primary Examiner*—Heather Shackelford
*Assistant Examiner*—Sunil Singh
(74) *Attorney, Agent, or Firm*—Foley & Lardner

(57) ABSTRACT

A vehicle impact system includes a road accommodating vehicle traffic in a direction along its center line, a support structure and first and second adjacent energy-absorbing fender elements supported by the support structure and extending adjacent to the road. Each of the first and second adjacent energy-absorbing fender elements includes an elastomeric leg extending non-parallel from the support structure and a contact panel extending from the leg. The contact panel has a contact surface extending substantially parallel to the road center line, a forward end and a rearward end. The forward end of the first adjacent fender element faces the rearward end of the second adjacent fender element such that when the contact surface of the first adjacent fender element is engaged by a vehicle, the leg of the first adjacent fender element resiliently flexes to move the forward end of the first adjacent fender element into engagement with the rearward end of the second adjacent fender element.

31 Claims, 2 Drawing Sheets

U.S. PATENT DOCUMENTS

| | | |
|---|---|---|
| 4,674,911 A | 6/1987 | Gertz |
| 4,733,992 A | 3/1988 | Dehlen |
| 4,844,213 A | 7/1989 | Travis |
| 4,848,969 A | 7/1989 | Murota et al. |
| 4,909,661 A | 3/1990 | Ivey |
| 5,097,785 A | 3/1992 | Zidek |
| 5,174,221 A | 12/1992 | Enami et al. |
| 5,199,755 A | 4/1993 | Gertz |
| 5,248,129 A | 9/1993 | Gertz |
| 5,314,261 A * | 5/1994 | Stephens ............... 404/6 |
| 5,361,715 A | 11/1994 | Kiedaisch et al. |
| 5,642,792 A | 7/1997 | June |
| 5,645,368 A | 7/1997 | Yunick |
| 5,791,811 A * | 8/1998 | Yoshino ............... 404/6 |
| 6,309,140 B1 * | 10/2001 | Kiedaisch et al. ......... 405/215 |
| 6,340,268 B1 * | 1/2002 | Alberson et al. ......... 404/6 |

* cited by examiner

ENERGY ABSORBING IMPACT SYSTEM

RELATED APPLICATIONS

The present continuation-in-part application claims priority under 35 U.S.C. §120 from U.S. patent application Ser. No. 09/407,508 entitled Fender System, filed on Sep. 28, 1999, now U.S. Pat. No. 6,309,140 the full disclosure of which is hereby incorporated by reference.

FIELD OF THE INVENTION

The present invention relates to energy absorbing impact systems. In particular, the present invention relates to barriers or walls extending adjacent to vehicle roads for absorbing energy from vehicles during collisions or crashes.

BACKGROUND OF THE INVENTION

Roads, including both highways and race tracks, are frequently bounded along their perimeter by rigid barrier walls. Such barrier walls protect both structures and people adjacent the road by preventing vehicles from accidentally leaving the road or adjacent shoulders. Such barrier walls are also sometimes provided to serve as sound barriers to shield against vehicle noise. However, such rigid barriers or barrier walls, alone, do not effectively absorb energy during a collision with a vehicle. As a result, collisions of the vehicle and the barrier wall often result in great damage to the vehicle and personal injury to the vehicle's driver and passengers.

In attempts to further protect the vehicle and the vehicle's driver and passengers during such collisions, many barrier walls now include energy absorbing systems. Energy absorbing systems for vehicles are most commonly found along race tracks where the vehicles travel at extremely high speeds and where the vehicles are more susceptible to collisions with the barrier walls. Such energy absorbing systems typically include stacks of tires adjacent to the perimeter of the road. Although commonly employed along race tracks, such stacks of tires do not effectively attenuate the G-forces created during a crash or collision with a vehicle. Moreover, when such stacks of tires are hit, the stacks of tires frequently break their restraints. As a result, loose tires are projected towards spectators and other competitors. In many situations, competitor vehicles following the first crash will lose control attempting to avoid the first accident which results in second-vehicle crashes. However, due to damage to the tire stack from the first vehicle crash, the tire stack is ineffective against further impacts or vehicles crashes. Reconstruction and replacement of the tire stacks is time consuming and expensive.

Thus, there is a continuing need for an energy absorbing system for a race track or other road that effectively absorbs the high energy G-forces created during collisions with high speed vehicles, that is effective against multiple and consecutive vehicle impacts, that is more durable and resistant to damage and that is easily and inexpensively repaired or replaced.

SUMMARY OF THE INVENTION

The present invention discloses a vehicle impact system including a road accommodating vehicle traffic in a direction along its center line, a support structure and first and second adjacent energy-absorbing fender elements supported by the support structure and extending adjacent to the road. Each of the first and second adjacent energy-absorbing fender elements includes an elastomeric leg extending non-parallel from the support structure and a contact panel extending from the leg. The contact panel has a contact surface extending substantially parallel to the road center line, a forward end and a rearward end. The forward end of the first adjacent fender element faces the rearward end of the second adjacent fender element such that when the contact surface of the first adjacent fender element is engaged by a vehicle, the leg of the first adjacent fender element resiliently flexes to move the forward end of the first adjacent fender element into engagement with the rearward end of the second adjacent fender element.

The present invention also discloses a fender system for use with a barrier wall adjacent a road accommodating vehicle traffic in a direction along the road's center line. The fender system includes a first energy-absorbing fender element and a second energy-absorbing fender element. The first energy-absorbing fender element includes a first elastomeric leg having a first base adapted to be coupled to the barrier wall such that the leg extends non-parallel from the barrier wall and a first contact panel extending from the first leg. The first contact panel has a first contact surface adapted to extend substantially parallel to the road's center line, a first forward end and a first rearward end. The second energy-absorbing fender element is adjacent to the first energy-absorbing element and includes a second elastomeric leg having a base adapted to be coupled to the barrier wall such that the second leg extends non-parallel from the barrier wall and a second contact panel extending from the second leg. The second contact panel has a second contact surface adapted to extend substantially parallel to the road's center line, a second forward end and a second rearward end. The second forward end is adapted to face the first rearward end when the first and second fender elements are coupled to the barrier wall such that when the first contact surface is engaged by a vehicle, the first leg resiliently flexes to move the first forward end into engagement with the second rearward end to transfer energy from the first fender element to the second fender element.

The present invention also provides an energy-absorbing fender element for use with a support structure along a road accommodating vehicle traffic in a direction along the road's center line. The fender element includes an elastomeric leg having a base configured to be coupled to the support structure and a contact panel coupled to the leg. The contact panel has a contact surface obliquely extending relative to the leg.

The present invention also provides an energy-absorbing impact system. The energy-absorbing impact system includes a thoroughfare along which traffic moves in a general direction, at least one support structure and first and second adjacent energy-absorbing fender elements supported by the at least one support structure and extending adjacent to the thoroughfare. Each of the first and second adjacent energy-absorbing fender elements includes at least one elastomeric leg obliquely extending from the at least one support structure and a contact panel extending from the at least one leg and from no other legs. Each leg does not substantially resist flexure in the direction of traffic. The contact panel has a contact surface facing the thoroughfare, a forward end and a rearward end. The forward end of the first adjacent fender element faces the rearward end of the second adjacent fender element such that when the contact surface of the first adjacent fender element is engaged by traffic, the at least one leg of the first adjacent fender element resiliently flexes to move the forward end of the first adjacent fender element into engagement with the rearward end of the second adjacent fender element.

DETAILED DESCRIPTION OF THE PREFERRED EMBODIMENTS

Figure 1:
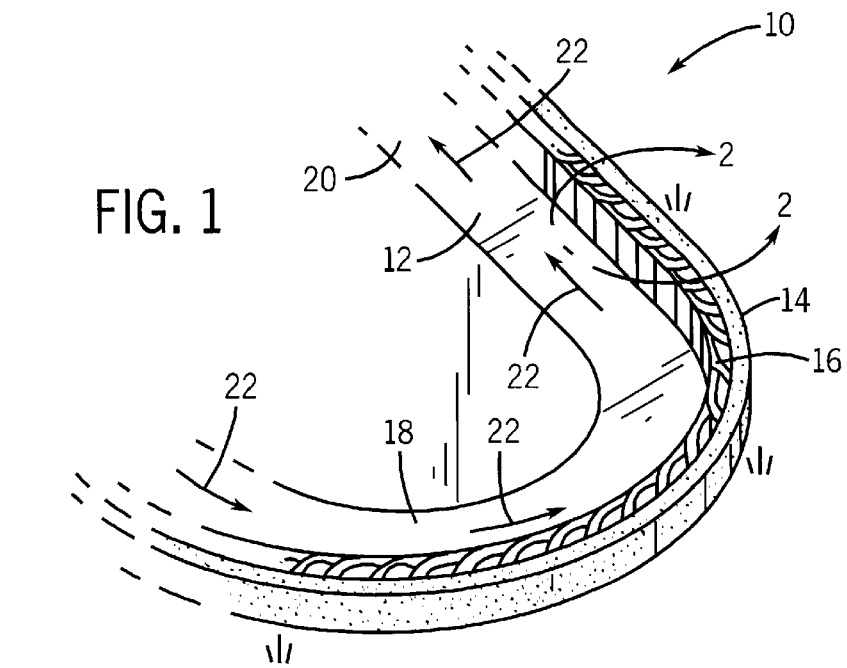
FIG. 1 is a fragmentary perspective view of a road side vehicle impact system of the present invention.
Figure 2:
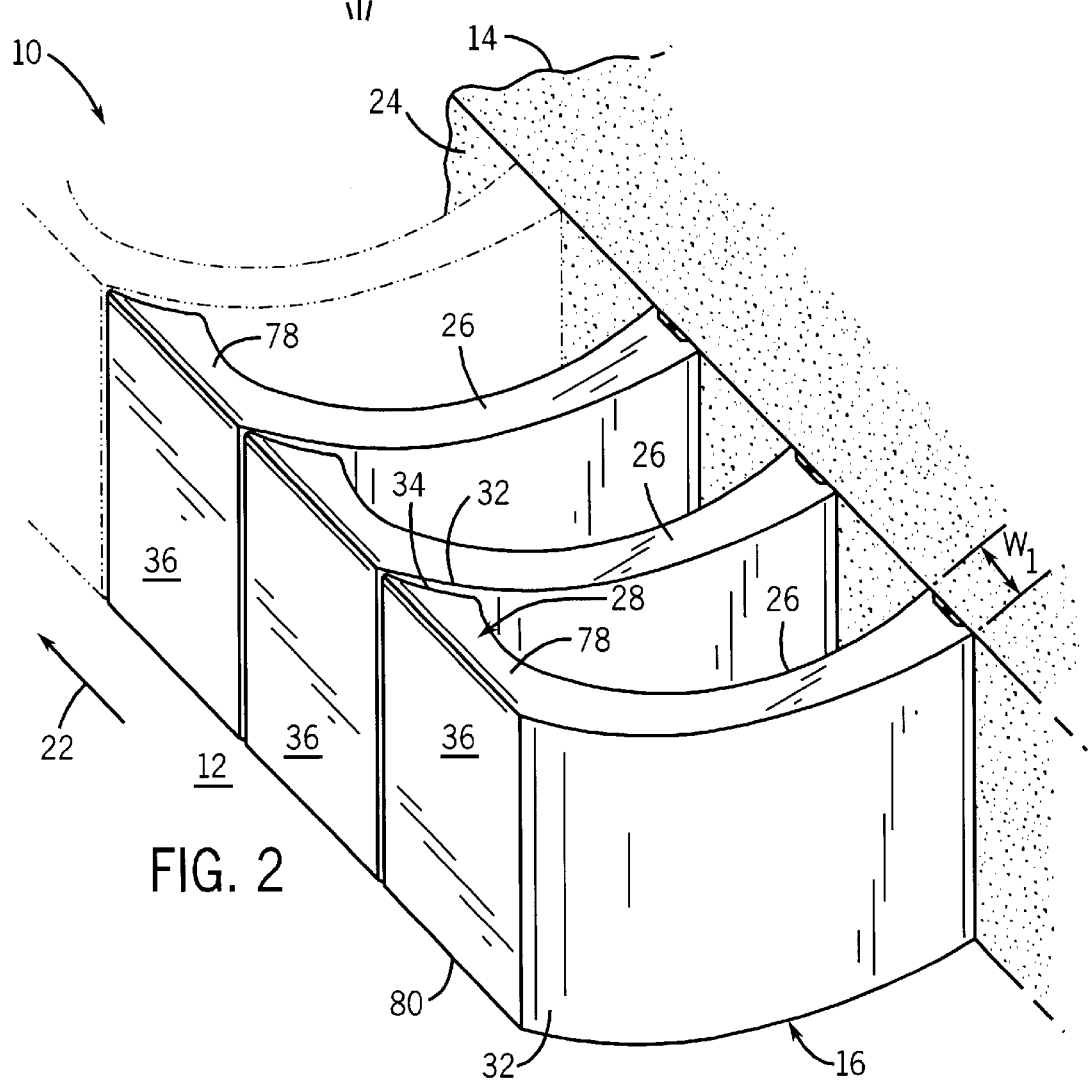
FIG. 2 is a greatly enlarged fragmentary perspective view of the system of FIG. 1 taken lines 2—2.

FIGS. 1 and 2 illustrate road side vehicle impact system 10. As shown by FIG. 1, system 10 generally includes road 12, support structure 14, and energy-absorbing fender elements 16. Road 12 is configured to accommodate vehicle traffic in a direction along its center line. In the exemplary embodiment, road 12 comprises a track or race way having a curved portion 18 having an embankment and a straight away portion 20. In lieu of comprising a race way, track or strip for various racing events, road 12 may alternatively comprise a highway, interstate or other road configuration for accommodating generally slower personal and public transportation vehicles. In the exemplary embodiment, road 12 accommodates vehicle traffic in a direction along its center line as indicated by arrows 22.

Support structure 14 comprises a structure stationarily mounted or embedded in place along a side of road 12. Support structure 14 supports fender elements 16 adjacent to road 12. Support structure 14 preferably comprises a continuous barrier wall formed from concrete along side road 12 and extending above road 12. Alternatively, support structure 14 may be made from a variety of alternative materials and may be formed from several independent sections or segments which are mounted or embedded in place adjacent to one another in side-by-side or overlapping fashion or at spaced-apart intervals along road 12. Support structure 14 has a front surface 24 which extends in a plane and extends tangent to the perimeter side of road 12 and preferably parallel to the center line of road 12. Because support structure 14 comprises a barrier wall, support structure 14 protects structures and people adjacent road 12 by preventing the vehicles from accidentally leaving road 12 and also supports fender elements 14 along road 12. Although less desirable, system 10 may alternatively utilize a separate barrier wall and distinct support structures which serve only to support fender elements 16 in place along road 12. Moreover, system 10 may omit the aforementioned separate barrier wall behind fender elements 16 and simply rely simply on the effective wall formed by fender elements 16 extending adjacent or at least proximate to one another.

Fender elements 16 extend between support structure 14 and road 12 along the side of perimeter of road 12. Fender elements 16 line surface 24 of support structure 14 to absorb energy from the moving vehicles upon road 12 when the moving vehicles accidentally impact fender elements 16.

As best shown by FIG. 2, fender elements 16 are aligned end-to-end along surface 24 of support structure 14 adjacent to road 12. Each energy-absorbing fender element 16 includes leg 26 and contact panel 28. Each fender element 16 preferably has the general shape of an "L" or of a hockey stick including a shaft providing leg 26 and a blade providing contact panel 28. Although less desirable, each fender element 16 may have a variety of other overall shapes and configurations. For example, fender element 16 may alternatively be "T" shaped in which the top of the "T" extends adjacent to road 12 or may be "Z" shaped in which the top of the "Z" extends adjacent to road 12.

Leg 26 comprises an elastomeric, resiliently flexible component extending non-parallel from support structure 14 to contact panel 28. Leg 26 is preferably formed from an elastomeric material such as sbr rubber. Alternatively, leg 26 may be formed from other resilient or elastomeric materials such as polyurethane. Although leg 26 is illustrated as being formed as a single unitary body from a single material, leg 26 may alternatively be formed as a composite of different co-molded materials having different strength, elastomeric and other properties so as to vary the characteristics of leg 26 between support structure 14 and contact panel 28 for optimal energy absorption and durability. Moreover, leg 26 may alternatively be formed from distinct components which are otherwise fastened, bonded or mounted to one another to form leg 26. As will be appreciated, the particular materials, structure and dimensions will vary depending upon the particular application.

Contact panel 28 extends from leg 26 and includes rearward end 32, forward end 34 and contact surface 36. Rearward end 32 and forward end 34 extend opposite one another on opposite ends of contact surface 36. Rearward end 32 faces forward end 34 of an adjacent fender element 16 while forward end 34 faces a rearward end 32 of an adjacent fender element 16. In the exemplary embodiment where fender element 16 is preferably in the shape of a hockey stick, rearward end 32 extends along the heel of the blade forming contact panel 28 and forward end 34 extends along the toe of the blade forming contact panel 28. Rearward and 32 and forward end 34 may alternatively extend along other surfaces of fender element 16 when fender element 16 has alternative configurations.

Contact surface 36 extends between rearward end and forward end 34 provides a surface against which vehicles moving along road 12 may impact prior to reaching surface 24 of support structure 14. Contact surfaces 36 of fender elements 16 form a continuous wall along the perimeter of road 12 between road 12 and support structure 14. During an accident, the vehicle may contact one or more contact surfaces 36. As a result, legs 26 resiliently flex to absorb energy from the impact with the moving vehicle. In addition, those legs 26 of fender elements 16 directly impacted upon by the moving vehicle flex to move forward ends 34 into engagement with rearward ends 32 of adjacent, non-impacted fender elements 16 further along in the direction of the moving vehicle indicated by arrow 22. As a result, those fender elements 16 "downstream" of the impacted upon fender elements 16 and their legs 26 also flex to assist in the absorption of energy from the impact with the vehicle. Because leg 26 of each fender element 16 does not extend in a direction facing traffic, leg 26 more easily flexes in the direction of traffic and does not substantially resist flexure in the direction of traffic. Because fender elements 16 are all positioned and supported so as to interact with one another, fender elements 16 more effectively absorb energy from the impact to better minimize or prevent damage to support structure 14, the vehicle and the vehicle's driver or passengers.

Although each of fender elements 16 is illustrated as having a single leg 26 supporting contact panel 28, fender elements 16 may alternatively be configured such that the contact panel 28 of each fender element 16 is supported and spaced from the support structure by multiple legs 26 so long as none of the multiple legs 26 resist flexure in the direction of traffic. In other words, none of the legs substantially resist flexing of the other such legs in the direction of traffic. For example, none of the multiple legs should extend in a direction against or facing the direction of traffic. Any such leg doing so should be configured to be much weaker than other legs not opposing the direction of traffic such that the other legs can flex in the direction of traffic without substantial opposition. Preferably, each of the multiple legs obliquely extends from the support structure 14 to the contact panel 28 in the direction of traffic. In such an alternative configuration where a single contact panel is supported by multiple legs 26 obliquely extending from a single support structure 14 or multiple support structures 14, each of the multiple legs preferably extend substantially parallel to one another.

Figure 3:
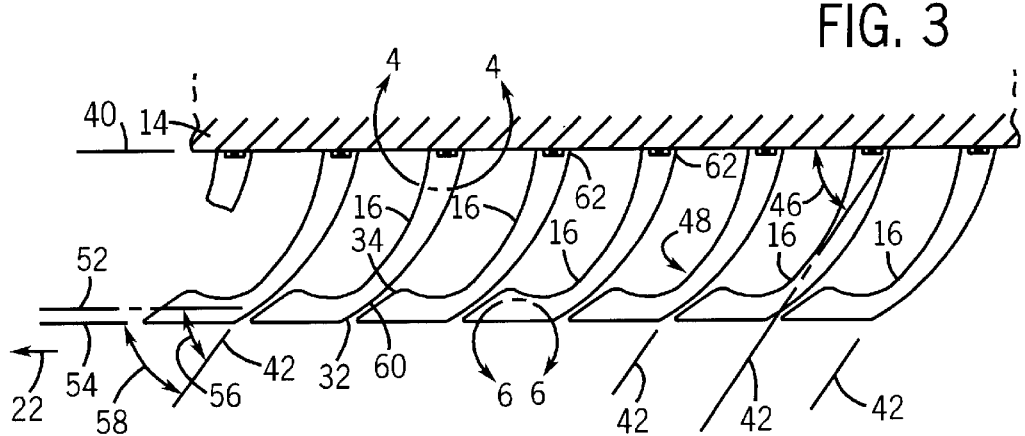
FIG. 3 is a fragmentary top elevational view of the system of FIG. 1.

FIGS. 3–6 illustrate system 10 in greater detail. As best shown by FIG. 3, surface 24 extends from a plane 40 along the direction of vehicle traffic as indicated by arrow 22. Legs 26 of fender elements 16 each extend along a center line 42 that is oblique to plane 40 in the direction of vehicle traffic as indicated by arrow 22. Center line 42 extends from a junction of support structure 14 and leg 26 through and within leg 26 and through contact surface 36. Each center line 42 and plane 40 forms an acute angle 46 facing the direction of vehicle traffic. In the exemplary embodiment, acute angle 46 is preferably between about 55 and 65 degrees. Acute angle 46 is nominally sixty-degrees. In addition, legs 26 extend along center lines 42 which are preferably parallel to one another to facilitate flexing of legs 26 in the general direction of traffic as indicated by arrow 22 during an impact. Legs 26 preferably extend along parallel arcs having a concave side 48 facing the traffic direction indicated by arrow 22. Alternatively, legs 26 may extend from support structure 14 and contact panel 28 in a more linear fashion. Because legs 26 lean away from the flow of traffic, legs 26 effectively reduce the G forces required to stop a vehicle.

As further shown by FIG. 3, each contact panel 28 and each contact surface 36 extend along planes 52 and 54, respectively. Contact panels 28 have bodies extending from legs 26 along plane 52 oblique to legs 26. In particular, contact panels 28 extend in planes 52 which are oblique to center lines 42. In the exemplary embodiment, planes 52 and center lines 42 are separated by an acute angle 56 facing towards the direction of traffic 22. Angle 56 is preferably from between about 55 degrees and about 65 degrees. In the exemplary embodiment illustrated in FIG. 3, angle 56 is sixty-degrees. Similarly, contact surface 36 extends in plane 54 which is parallel to plane 52. Accordingly, contact surfaces 36 extend in plane 54 at an acute angle 58 identical to angle 56. Because each of legs 26 extend at the same angle from support structure 14 and because each of contact panels 28 and contact surfaces 36 extend from legs 26 at substantially the same angle, contact surfaces 36 of each of fender elements 16 are coplanar prior to impact to form a substantially continuous smooth wall. As a result, system 10 omits corners or protrusions which otherwise might snag upon a passing vehicle.

As further shown by FIG. 3, rearward end 32 and forward end 34 of adjacent fender elements 16 are spaced from one another by a gap 60. As a result, fender elements 16 may be manufactured without high tolerance requirements. Gap 60 also enables fender elements 16 to be easily lifted and replaced or repaired.

As discussed above, during a vehicle collision, legs 26 of an impacted-upon fender element 16 will flex to move forward end 34 into engagement with rearward end 32 of an adjacent fender element 16. To facilitate transfer of force from the impacted-upon fender elements to an adjacent fender elements 16 without extensive damage to fender element 16, rearward end 32 and forward end 34 are complementarily configured so as to fully or substantially fully abut one another when forces are being transferred between adjacent fender elements. As shown by FIG. 3, rearward end 32 has an arcuate convex contour while forward end 34 has a complementary arcuate concave contour. Alternatively, rearward end 32 and forward end 34 may have various other complementary configurations or contours.

Figure 4:
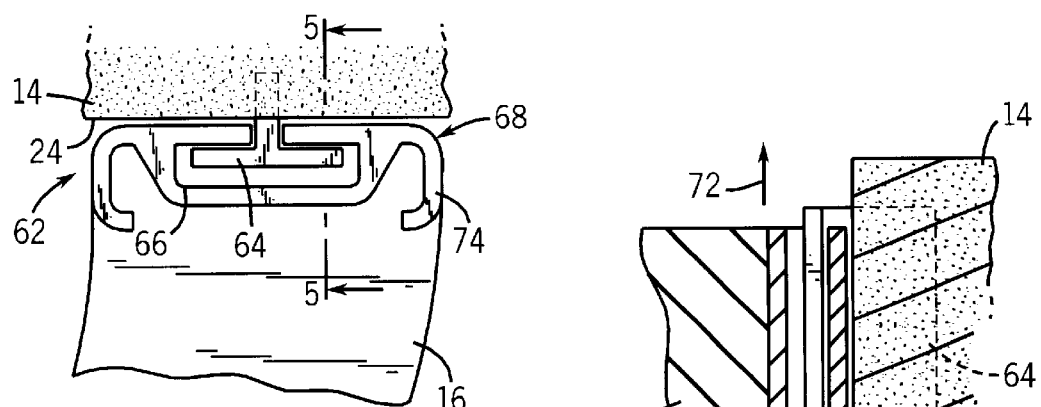
FIG. 4 is a greatly enlarged fragmentary top elevational view of the system of FIG. 3 taken along lines 4—4.
Figure 5:
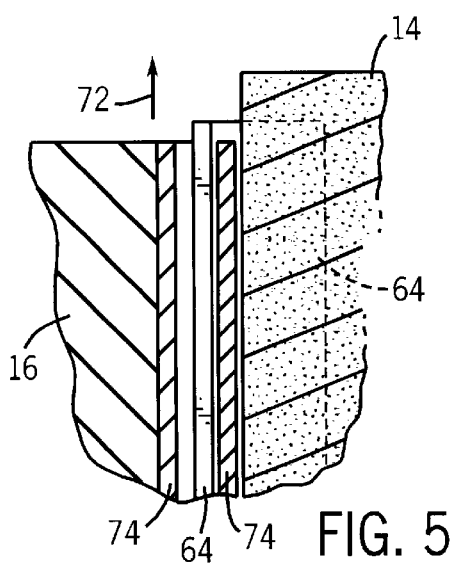
FIG. 5 is a sectional view of the system of FIG. 4 taken lines 5—5.

As best shown by FIGS. 4 and 5, each fender element 16 is removably mounted to support structure 14 by anchor system 62. Anchor system 62 generally includes key 64 and key way 66. Key 64 comprises a T-shaped male protuberance fixedly coupled to support structure 14 and projecting forward of surface 24. Key way 66 comprises a T-shaped slot formed within base 68 of leg 26 of fender element 16. Key way 66 slidably receives key 64 such that key 64 and key way 66 cooperate to retain base 68 against surface 24 of support structure 14. Because key 64 and key way 66 releasably secure fender element 16 to support structure 14, fender element 16 may be separated from support structure 14 for repair or replacement by simply lifting fender element 16 in the direction indicated by arrow 72 (shown in FIG. 5). Likewise, a new or repaired fender element 16 may be mounted to support structure 14 by simply aligning key way 66 with key 64 and lowering fender element 16. As a result, system 10 may be easily repaired in little time without interruption of vehicle traffic.

To prevent deformation or other damage to key way 66, key way 66 is bounded or defined by liner 74. Liner 74 comprises a rigid metal plate forming key way 66 and preferably embedded along base 68 of leg 26. In the exemplary embodiment, liner 74 is co-molded as part of leg 26. Alternatively, liner 74 may be adhesively secured, bonded or otherwise fastened to base 68 of leg 26.

As will now be appreciated, various alternative anchor systems may be employed in lieu of anchor system 62 to releasably support fender element 16 adjacent to support structure 14. For example, although key 64 is illustrated as a rigid metal T-shaped protruberance at least partially embedded in the concrete forming support structure 14, key 64 may alternatively be integrally formed as part of a single unitary body with support structure 14. Although key way 66 is illustrated as being bounded or lined by liner 74, key way 66 may be bounded directly by leg 26 or by a protective coating or layer bonded or secured to base 68 of leg 26. Although key 64 and key way 66 are illustrated as a T-shaped member and a T-slot, key 64 and key way 66 may alternatively comprise other key and key way configurations which enable fender elements 16 to releasably supported by and connected to support structure 14.

Figure 6:
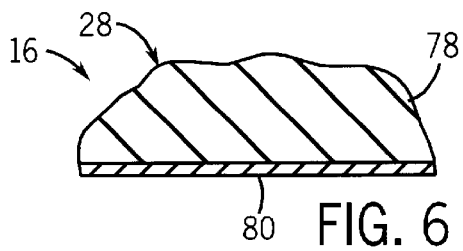
FIG. 6 is a greatly enlarged fragmentary sectional view of the system of FIG. 3 taken along lines 6—6.

As best shown by FIG. 6, each contact panel 28 includes support portion 78 and shield 80. Support portion 78 is coupled to leg 26 and supports shield 80. Support portion 78 is preferably integrally formed as a single unitary body with leg 26 out of the same resilient material as leg 26. Alternatively, support portion 78 may be formed from a rigid, non-resilient material co-molded with, bonded to or fastened to leg 26. Support portion 78 should preferably be sufficiently rigid so as to transmit force from rearward end 32 to forward end 34 and to an adjacent fender element 16.

Shield 80 extends along support portion 78 and defines contact surface 36. Shield 80 preferably comprises a panel formed from a semi-rigid, low friction, wear resistant and flame resistant material. Shield 80 is preferably formed from ultra high molecular weight polyethylene. Alternatively, shield 80 may be formed from a variety of other materials having similar characteristics. As will be appreciated, shield 80 may be made from materials having alternative characteristics depending upon the application. Shield 80 preferably has a thickness of approximately 0.5 inches (1.27 cm). In the exemplary embodiment, shield 80 is adhesively bonded to support portion 78. Alternatively, shield 80 may comprise a layer of such material coated upon support portion 78. Moreover, shield 80 may be secured to support portion 78 by fasteners or may be co-molded or embedded to support portion 78. Shield 80 reinforces and protects support portion 78 of contact panel 28. Moreover, shield 80 resists impingement of vehicle surfaces into contact surface 36 to minimize wear and tear on system 10. At the same time, shield 80 reduces the likelihood of a crashing vehicle catching or snagging upon contact surfaces 36 during light-to-moderate non-crash contact. As a result, vehicles can ride along contact surfaces 36 of fender 16 with little or no damage to either system 10 or the vehicle. Although less desirable, shield 80 may be omitted.

According to the most preferred embodiment illustrated in FIG. 2, each fender element 16 is configured such that base 68 has a width W1 of approximately 10 inches (25.4 cm), such that leg 26 has a minimal width W2 of approximately 6 inches (15.24 cm), such that contact surface 36 has a width W3 of approximately 29.5 inches (74.93 cm). Each contact panel 28 has a length L1 of approximately 6 inches (15.24 cm) and each fender element 16 has an overall length L2 extending between base 62 and contact surface 36 of approximately 60 inches (152.4 cm). Each contact surface 36 of each fender element 16 has a height H1 of approximately 48 inches (121.92 cm). The center lines of each of contact surfaces 36 are separated by approximately 30 inches (76.2 cm) such that gap 60 has a width W4 of approximately 0.5 inches (1.27 cm). As will be appreciated, the exact dimensions of each fender element 16 will vary to a large extent depending upon the particular application.

Figure 7:
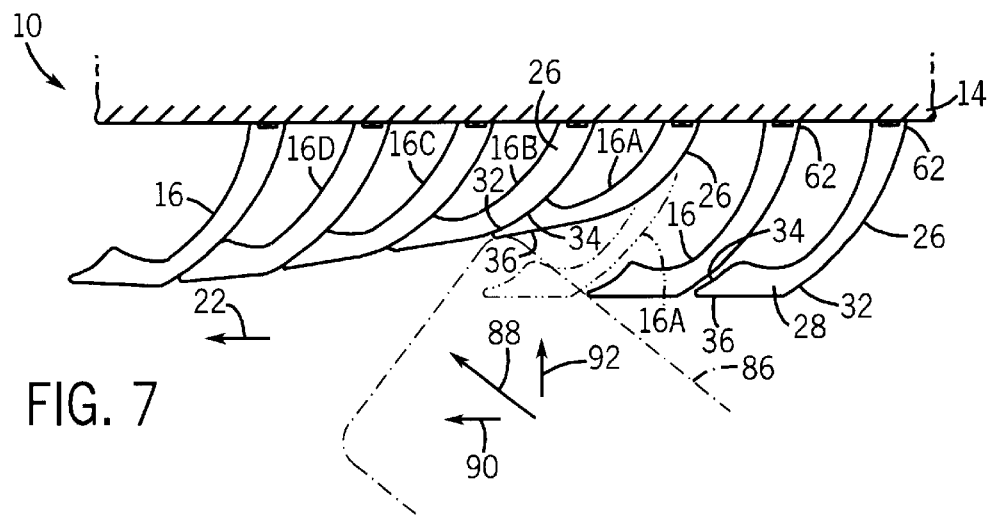
FIG. 7 is a top elevational view of the system of FIG. 3 during a collision with a vehicle.

FIG. 7 illustrates system 10 during impact with vehicle 86 moving in the direction indicated by arrow 88. Vehicle 86 exerts a force upon system 10 in both of the directions indicated by arrows 90 and 92. As shown by FIG. 7, vehicle 86 initially contacts contact surface 36 of fender element 16A. As a result, leg 26 of fender element 16A flexes in both the directions indicated by arrows 90 and 92 to absorb energy from the collision. At the same time, leg 26 flexes to move forward end 34 of fender element 16A into engagement with rearward end 32 of fender element 16B. As a result, forces are further transmitted to fender element 16B, causing leg 26 of fender element 16B to also flex in the directions indicated by arrows 90 and 92 and to also absorb energy. This reaction continues between fender elements 16C, 16D and so on until the energy from vehicle 86 is absorbed by system 10. In addition to absorbing the energy from vehicle 86, fender elements 16 also deflect the impacting vehicle towards the next downstream adjacent fender element in the direction of traffic as indicated by arrow 22. After vehicle 86 has been deflected from a first fender element to a second downstream adjacent fender element, the first fender element immediately elastically recovers and returns to its original position. As a result, the first fender element is able to receive a second impact from a second vehicle in those situations where the second vehicle loses control and crashes while attempting to avoid the first accident. In the exemplary embodiment illustrated in FIG. 7, it has been found that each fender element 16 is capable of receiving a second impact with more than 80% of its original efficiency within 3 seconds of a first impact and with more than 98% of its original efficiency within 10 minutes of the first impact. Consequently, system 10 is well adapted to accommodating multiple high speed vehicle impacts which occur within a relatively short time span.

As shown by FIG. 7, system 10 is well suited for accommodating multiple high-speed vehicle impacts such as in a race event or such as on a public or private highway or tollway. Although system 10 is illustrated as being used along a road thoroughfare for absorbing automotive vehicle impacts, system 10 may alternatively be configured for use along rivers, lakes or along other marine thoroughfares to absorb energy from marine vehicles such as boats and ships. Overall, system 10 is advantageous in any application where a vehicle or object moves in a general direction and where a structure must be provided to either guide movement of the vehicle or object or to contain the vehicle or object when the vehicle or object goes out of its intended directional course.

Although the present invention has been described with reference to preferred embodiments, workers skilled in the art will recognize that changes may be made in form and detail without departing from the spirit and scope of the invention. Because the technology of the present invention is relatively complex, not all changes in the technology are foreseeable. The present invention described with reference to the preferred embodiments and set forth in the following claims is manifestly intended to be as broad as possible. For example, unless specifically otherwise noted, the claims reciting a single particular element also encompass a plurality of such particular elements.

What is claimed is:

1. A vehicle impact system comprising:
   a road accommodating vehicle traffic in a direction along its center line;
   at least one support structure; and
   first and second adjacent energy absorbing fender elements supported by the at least one support structure and extending adjacent to the road, each of the first and second adjacent energy absorbing fender elements including:
      an elastomeric leg obliquely extending from the support structure prior to vehicle impact; and
      a contact panel extending from the leg, the contact panel having a contact surface extending substantially parallel to the road's center line, a forward end and a rearward end, wherein the forward end of the first adjacent fender element faces the rearward end of the second adjacent fender element such that when the contact surface of the first adjacent fender element is engaged by a vehicle, the leg of the first adjacent fender element resiliently flexes to move the forward end of the first adjacent fender element into engagement with the rearward end of the second adjacent fender element.

2. The system of claim 1 wherein each leg of the first and second adjacent fender elements obliquely extends from the at least one support structure in the direction of vehicle traffic prior to vehicle impact.

3. The system of claim 2 wherein each leg of the first and second adjacent fender elements obliquely extends from the at least one support structure at an angle of approximately 60 degrees.

4. The system of claim 1 wherein the contact panel of each of the first and second adjacent fender elements obliquely extends from its respective leg to form an obtuse angle in the direction of vehicle traffic prior to vehicle impact.

5. The system of claim 4 wherein the contact panel of each of the first and second adjacent fender elements obliquely extends from its respective leg at an angle of approximately 120 degrees in the direction of vehicle traffic prior to vehicle impact.

6. The system of claim 1 wherein the leg of each of the first and second fender elements includes a base removably coupled to the at least one support structure.

7. The system of claim 6 wherein a first one of the base and the at least one support structure includes a key way and a second one of the base and the at least one support structure includes a key, wherein the key way receives the key to couple the fender element base to the at least one support structure.

8. The system of claim 1 wherein the contact panel of each of the first and second adjacent fender elements includes:
a support portion coupled to the leg; and
a shield including at least one material distinct from the support portion, wherein the shield is coupled to the support portion, the shield providing the contact surface.

9. The system of claim 8 wherein the shield is formed from an ultra high molecular weight polyethylene material.

10. The system of claim 8 wherein the support portion and the leg are integrally formed as a single unitary body.

11. The system of claim 8 wherein the leg and the contact panel have a generally L-shaped configuration.

12. The system of claim 1 wherein the contact surface includes an outer layer of semi-rigid, low friction, wear resistant and flame resistant material.

13. The system of claim 1 wherein the leg and the contact panel have a generally L-shaped configuration.

14. The system of claim 1 wherein the contact surface of the first adjacent fender element and the contact surface of the second adjacent fender element are substantially coplanar.

15. The system of claim 1 wherein the leg of the first adjacent fender element and the leg of the second adjacent fender element extend substantially parallel to one another.

16. The system of claim 1 wherein the forward end and the rearward end each extend away from the contact surface in a direction non-parallel to the contact surface, wherein the forward end of the first adjacent fender element and the rearward end of the second adjacent fender element face one another and are spaced from one another prior to vehicle impact.

17. The system of claim 1 wherein the forward end and the rearward end each extend away from the contact surface in a direction non-parallel to the contact surface wherein the forward end of the first adjacent fender element and the rearward end of the second adjacent fender element have substantially complementary configurations such that the forward end of the first adjacent fender element and the rearward end of the second adjacent fender element mate when in engagement with one another during vehicle impact.

18. The system of claim 1 wherein the legs of the first and second adjacent fender elements extend along an arc prior to vehicle impact.

19. The system of claim 1 wherein the at least one support structure comprises a barrier wall.

20. The system of claim 1 wherein the contact panel extends vertically downward to a height substantially proximate a surface of the road.

21. The system of claim 1 wherein each fender element is configured so as to receive a second impact with more than 80% of its original efficiency within 3 seconds of a first impact and with more than 98% of its original efficiency within 10 minutes of the first impact.

22. A fender system for use with a support structure adjacent a road accommodating vehicle traffic in a direction along the road's center line, the fender system comprising:
a first energy absorbing fender element including:
a first elastomeric leg having a first base adapted to be coupled to the support structure such that the leg extends in a direction oblique to the center line; and
a first contact panel extending from the first leg, the first contact panel having a first contact surface adapted to extend substantially parallel to the road's center line, a first forward end and a first rearward end; and
a second energy absorbing fender element adjacent the first energy absorbing fender element, the second energy absorbing fender element including:
a second elastomeric leg having a base adapted to be coupled to the support structure such that the second leg extends in a direction oblique to the center line; and
a second contact panel extending from the second leg, the second contact panel having a second contact surface adapted to extend substantially parallel to the road's center line, a second forward end and a second rearward end, wherein the first forward end is adapted to face the second rearward end when the first and second fender elements are coupled to the support structure such that when the first contact surface is engaged by a vehicle, the first leg resiliently flexes to move the first forward end into engagement with the second rearward end to transfer energy from the first fender element to the second fender element.

23. An energy absorbing impact system comprising:
a thoroughfare along which traffic moves in a general direction;
at least one support structure; and
first and second adjacent energy absorbing fender elements supported by the at least one support structure and extending adjacent to the thoroughfare, each of the first and second adjacent energy absorbing fender elements including:
at least one elastomeric leg obliquely extending from the at least one support structure wherein each leg does not substantially resist flexure in the direction of traffic; and
a contact panel extending from the at least one leg and from no other legs and being connected to the at least one support structure solely by the at least one leg, the contact panel having a contact surface facing the thoroughfare, a forward end and a rearward end, wherein the forward end of the first adjacent fender element faces the rearward end of the second adjacent fender element such that when the contact surface of the first adjacent fender element is engaged by traffic, the at least one leg of the first adjacent fender element resiliently flexes to move the forward end of the first adjacent fender element into engagement with the rearward end of the second adjacent fender element.

24. The system of claim 23 wherein the thoroughfare comprises a road and wherein the traffic comprises automotive vehicle traffic.

25. The system of claim 23 wherein each leg coupled to the contact panel extends in the direction of traffic.

26. The system of claim 23 wherein each fender element is configured so as to receive a second impact with more than 80% of its original efficiency within 3 seconds of a first impact and with more than 98% of its original efficiency within 10 minutes of the first impact.

27. A vehicle impact system comprising:
   a road accommodating vehicle traffic in a direction along its center line;
   at least one support structure; and
   first and second adjacent energy absorbing fender elements supported by the at least one support structure and extending adjacent to the road, each of the first and second adjacent energy absorbing fender elements including:
      an elastomeric leg extending non-parallel from the support structure;
      a contact panel extending from the leg, the contact panel having a contact surface extending substantially parallel to the road's center line, a forward end and a rearward end, wherein the forward end of the first adjacent fender element faces the rearward end of the second adjacent fender element such that when the contact surface of the first adjacent fender element is engaged by a vehicle, the leg of the first adjacent fender element resiliently flexes to move the forward end of the first adjacent fender element into engagement with the rearward end of the second adjacent fender element, and wherein a first one of the base and the at least one support structure includes a key way and a second one of the base and the at least one support structure includes a key, wherein the key way receives the key to couple the fender element base to the at least one support structure.

28. A vehicle impact system comprising:
   a road accommodating vehicle traffic in a direction along its center line;
   at least one support structure; and
   first and second adjacent energy absorbing fender elements supported by the at least one support structure and extending adjacent to the road, each of the first and second adjacent energy absorbing fender elements including:
      an elastomeric leg extending non-parallel from the support structure; and
      a contact panel extending from the leg, the contact panel having a contact surface extending substantially parallel to the road's center line, a forward end and a rearward end, the contact panel including a support portion coupled to the leg, and a shield including at least one material distinct from the support portion, wherein the shield is coupled to the support portion, the shield providing the support surface, wherein the forward end of the first adjacent fender element faces the rearward end of the second adjacent fender element such that when the contact surface of the first adjacent fender element is engaged by a vehicle, the leg of the first adjacent fender element resiliently flexes to move the forward end of the first adjacent fender element into engagement with the rearward end of the second adjacent fender element.

29. The system of claim 28 wherein the shield includes an outer layer of semi-rigid, low friction, wear resistant, and flame resistant material.

30. The system of claim 29 wherein the material includes ultra high molecular weight polyethylene material.

31. A vehicle impact system comprising:
   a road accommodating vehicle traffic in a direction along its center line;
   at least one support structure; and
   first and second adjacent energy absorbing fender elements supported by the at least one support structure and extending adjacent to the road, each of the first and second adjacent energy absorbing fender elements including:
      an elastomeric leg extending non-parallel from the support structure; and
      a contact panel extending from the leg, the contact panel having a contact surface extending substantially parallel to the road's center line, a forward end and a rearward end, wherein the leg and the contact panel have a generally L-shaped configuration, wherein the forward end of the first adjacent fender element faces the rearward end of the second adjacent fender element such that when the contact surface of the first adjacent fender element is engaged by a vehicle, the leg of the first adjacent fender element resiliently flexes to move the forward end of the first adjacent fender element into engagement with the rearward end of the second adjacent fender element.

* * * * *